US012617395B2

(12) United States Patent (10) Patent No.: US 12,617,395 B2
Nishijima (45) Date of Patent: May 5, 2026

(54) DRIVING ASSISTANCE APPARATUS

(71) Applicant: TOYOTA JIDOSHA KABUSHIKI KAISHA, Aichi (JP)

(72) Inventor: Masakazu Nishijima, Ebina (JP)

(73) Assignee: TOYOTA JIDOSHA KABUSHIKI KAISHA, Aichi (JP)

( * ) Notice: Subject to any disclaimer, the term of this patent is extended or adjusted under 35 U.S.C. 154(b) by 119 days.

(21) Appl. No.: 18/740,516

(22) Filed: Jun. 12, 2024

(65) Prior Publication Data

US 2024/0416903 A1 Dec. 19, 2024

(30) Foreign Application Priority Data

Jun. 19, 2023 (JP) ................................ 2023-099876

(51) Int. Cl.
B60W 30/09 (2012.01)
B60W 50/14 (2020.01)
G08G 1/16 (2006.01)

(52) U.S. Cl.
CPC ............ B60W 30/09 (2013.01); B60W 50/14 (2013.01); G08G 1/167 (2013.01); B60W 2552/10 (2020.02); B60W 2552/53 (2020.02); B60W 2554/406 (2020.02); B60W 2554/804 (2020.02); B60W 2710/20 (2013.01); B60W 2720/106 (2013.01)

(58) Field of Classification Search
CPC .. B60W 30/09; B60W 50/14; B60W 2552/10; B60W 2552/53; B60W 2554/406; B60W 2554/804; B60W 2710/20; B60W 2720/106; B60W 30/0956; B60W 40/02; B60W 2520/10; B60W 2552/45; B60W 2552/50; B60W 2554/4029; G08G 1/167; G08G 1/166
See application file for complete search history.

(56) References Cited

U.S. PATENT DOCUMENTS

| | | | |
|---|---|---|---|
| 9,105,190 | B2 | 8/2015 | Akiyama |
| 9,393,960 | B2 | 7/2016 | Kodaira |
| 9,483,945 | B2 | 11/2016 | Okita et al. |
| 9,873,412 | B2 | 1/2018 | Moriizumi |
| 10,793,147 | B2 | 10/2020 | Kaminade et al. |

(Continued)

FOREIGN PATENT DOCUMENTS

| | | | |
|---|---|---|---|
| JP | 5004865 | B2 | 8/2012 |
| JP | 5063637 | B2 | 10/2012 |

(Continued)

OTHER PUBLICATIONS

Machine Translation of Keisuke's reference (JP-2021144524-A) (Year: 2021).*

*Primary Examiner* — Tarek Elarabi
(74) *Attorney, Agent, or Firm* — HAUPTMAN HAM, LLP

(57) ABSTRACT

A driving assistance apparatus includes a crosswalk detection unit configured to detect a crosswalk in front of a host vehicle, an area setting unit configured to set, on an adjacent lane, an obstacle detection area for detecting an obstacle on the adjacent lane on a near side of the crosswalk, an obstacle detection unit configured to detect a presence or absence of the obstacle in the obstacle detection area, and a driving assistance unit configured to perform a driving assistance when the obstacle is detected in the obstacle detection area.

17 Claims, 11 Drawing Sheets

(56) References Cited

U.S. PATENT DOCUMENTS

| | | | |
|---|---|---|---|
| 12,162,479 B2 * | 12/2024 | Mizoguchi | B60W 30/0956 |
| 2014/0147007 A1 * | 5/2014 | Hayakawa | G06V 20/58 |
| | | | 382/103 |
| 2015/0302586 A1 * | 10/2015 | Fukata | G06T 3/08 |
| | | | 382/103 |
| 2019/0023239 A1 * | 1/2019 | Fujita | G08G 1/16 |
| 2019/0033443 A1 * | 1/2019 | Yoshikawa | G08G 1/168 |
| 2021/0061309 A1 | 3/2021 | Kawanai | |
| 2021/0107521 A1 | 4/2021 | Fujita et al. | |
| 2021/0107528 A1 | 4/2021 | Fujita et al. | |
| 2021/0146956 A1 | 5/2021 | Fujita et al. | |
| 2021/0146958 A1 | 5/2021 | Tanaka et al. | |
| 2022/0402484 A1 * | 12/2022 | Mizoguchi | B60W 30/0956 |
| 2023/0182769 A1 * | 6/2023 | Mizoguchi | B60W 40/072 |
| | | | 701/23 |
| 2023/0211778 A1 * | 7/2023 | Kim | G06V 20/58 |
| | | | 701/301 |
| 2024/0425040 A1 * | 12/2024 | Nishijima | B60W 50/14 |
| 2025/0148917 A1 * | 5/2025 | Nishijima | B60W 30/18159 |

FOREIGN PATENT DOCUMENTS

| | | | | |
|---|---|---|---|---|
| JP | 2021144524 A | * | 9/2021 | B60W 30/08 |
| JP | 2022-148428 A | | 10/2022 | |
| JP | 2023-002222 A | | 1/2023 | |

* cited by examiner

DRIVING ASSISTANCE APPARATUS

CROSS-REFERENCE TO RELATED APPLICATIONS

This application is based upon and claims the benefit of priority from Japanese Patent Application No. 2023-099876, filed on Jun. 19, 2023, the entire contents of which are incorporated herein by reference.

BACKGROUND

Field

The present disclosure relates to a driving assistance apparatus that performs driving assistance for a host vehicle.

A driving assistance apparatus in a vehicle has conventionally performed driving assistance such as deceleration when detecting a pedestrian or the like who is about to cross a crosswalk. For example, Japanese Unexamined Patent Publication No. 2022-148428 discloses that the presence or absence of a pedestrian near a crosswalk is determined by using not only a captured image of a camera mounted on a host vehicle but also a captured image of an external camera, and driving assistance such as notification is performed.

SUMMARY

When another vehicle is present in an adjacent lane adjacent to the own lane, a blind spot is generated by the other vehicle, and it may be difficult to detect a pedestrian or the like who is about to cross a crosswalk. Japanese Unexamined Patent Publication No. 2022-148428 describes that a captured image of an external camera is used, but it may be difficult to acquire such a captured image of the external camera.

The present disclosure describes a driving assistance apparatus capable of more appropriately performing driving assistance for a host vehicle in front of a crosswalk.

A driving assistance apparatus according to one aspect of the present disclosure is [1] "a driving assistance apparatus configured to perform a driving assistance for a host vehicle, the driving assistance apparatus including a crosswalk detection unit configured to detect a crosswalk in front of the host vehicle, an area setting unit configured to set, on an adjacent lane adjacent to an own lane, an obstacle detection area for detecting an obstacle on the adjacent lane on a near side of the crosswalk that has been detected, an obstacle detection unit configured to detect a presence or absence of the obstacle in the obstacle detection area that has been set, and a driving assistance unit configured to perform the driving assistance including at least one of notification to an occupant of the host vehicle, steering control of the host vehicle, and deceleration control of the host vehicle when the obstacle is detected in the obstacle detection area".

This driving assistance apparatus performs driving assistance when an obstacle is detected in an obstacle detection area set in front of a crosswalk on an adjacent lane. That is, the driving assistance apparatus performs driving assistance in advance in preparation for a case where a pedestrian or the like who is about to cross a crosswalk is present in a situation where a blind spot is generated by an obstacle in the obstacle detection area. The driving assistance apparatus thus can more appropriately performs driving assistance for the host vehicle in front of a crosswalk.

The driving assistance apparatus may be [2] "the driving assistance apparatus according to [1], wherein the area setting unit is configured to set an area having a length equal to or longer than two other vehicles along an extending direction of the adjacent lane as the obstacle detection area". For example, a plurality of other vehicles may form a row as obstacles in front of a crosswalk on an adjacent lane. In this case, another vehicle closer to the far side (the side closer to the crosswalk) as viewed from the host vehicle has a larger area hidden by another vehicle immediately in front of the other vehicle as viewed from the host vehicle. Thus, it is more difficult to detect the other vehicle as the other vehicle is on the far side. In other words, when another vehicle on an adjacent lane is detected, it is easier to detect another vehicle as the other vehicle is closer to the host vehicle. Thus, the driving assistance apparatus sets an area having a length equal to or longer than two other vehicles as the obstacle detection area for detecting another vehicle. This allows the driving assistance apparatus to easily detect another vehicle located on the near side even when other vehicles form a row on an adjacent lane and it is difficult to detect another vehicle on the far side, for example. In this manner, the driving assistance apparatus can more appropriately detect an obstacle (for example, another vehicle) located in front of the crosswalk on an adjacent lane. The driving assistance apparatus can perform driving assistance based on the detected obstacle.

The driving assistance apparatus may be [3] "the driving assistance apparatus according to [1] or [2], the driving assistance apparatus further including a congestion information acquisition unit configured to acquire congestion information of the adjacent lane, wherein the area setting unit is configured to determine whether the adjacent lane is congested based on the congestion information that has been acquired, and the area setting unit is configured to set a length of the obstacle detection area along an extending direction of the adjacent lane to be long when the adjacent lane is congested as compared to a case where the adjacent lane is not congested". When congestion occurs in an adjacent lane, other vehicles form a row in the adjacent lane. In this case, another vehicle on the far side as viewed from the host vehicle has a larger area hidden by another vehicle immediately before the other vehicle and is difficult to be detected. Thus, when congestion occurs in an adjacent lane, the driving assistance apparatus sets the length of the obstacle detection area to be long. This allows the driving assistance apparatus to more appropriately detect, as an obstacle, another vehicle located in front of a crosswalk on the adjacent lane even when other vehicles form a row.

The driving assistance apparatus may be [4] "the driving assistance apparatus according to any one of [1] to [3], wherein the area setting unit is configured to set a length of the obstacle detection area along an extending direction of the adjacent lane to be longer as a distance to the crosswalk is longer". Here, for example, it may be difficult to detect an obstacle at a position distant from the host vehicle because of the influence of noise or the like. Thus, the driving assistance apparatus can increase the possibility of detecting an obstacle located in front of a crosswalk on an adjacent lane by setting the length of the obstacle detection area to be longer as the distance to the crosswalk is longer.

The driving assistance apparatus may be [5] "the driving assistance apparatus according to any one of [1] to [4], wherein the area setting unit is configured to set a length of the obstacle detection area along an extending direction of the adjacent lane to be longer as a vehicle speed of the host vehicle is faster". Here, when the vehicle speed of the host vehicle is fast, the moving amount of an obstacle becomes relatively large, and it may be difficult to detect an obstacle.

Thus, the driving assistance apparatus sets the length of the obstacle detection area to be longer as the vehicle speed of the host vehicle is faster. This allows the driving assistance apparatus to increase the possibility of detecting an obstacle located in front of a crosswalk on an adjacent lane.

The driving assistance apparatus may be [6] "the driving assistance apparatus according to any one of [1] to [5], wherein the obstacle detection unit is configured to detect, as a presence or absence of the obstacle, a presence or absence of another vehicle whose speed is equal to or less than a predetermined vehicle speed threshold in the obstacle detection area, and the driving assistance unit is configured to perform the driving assistance when the other vehicle whose speed is equal to or less than the vehicle speed threshold is detected in the obstacle detection area". For example, when the vehicle speed of another vehicle on an adjacent lane is fast is considered to be a situation where there is no pedestrian or the like who is about to cross a crosswalk. Thus, the driving assistance apparatus performs driving assistance when another vehicle whose speed is equal to or less than the vehicle speed threshold is detected in the obstacle detection area. This allows the driving assistance apparatus to perform driving assistance in consideration of the possibility of the presence of a pedestrian or the like who is about to cross a crosswalk.

According to one aspect of the present disclosure, it is possible to more appropriately perform driving assistance for a host vehicle in front of a crosswalk.

DETAILED DESCRIPTION

Figure 1:
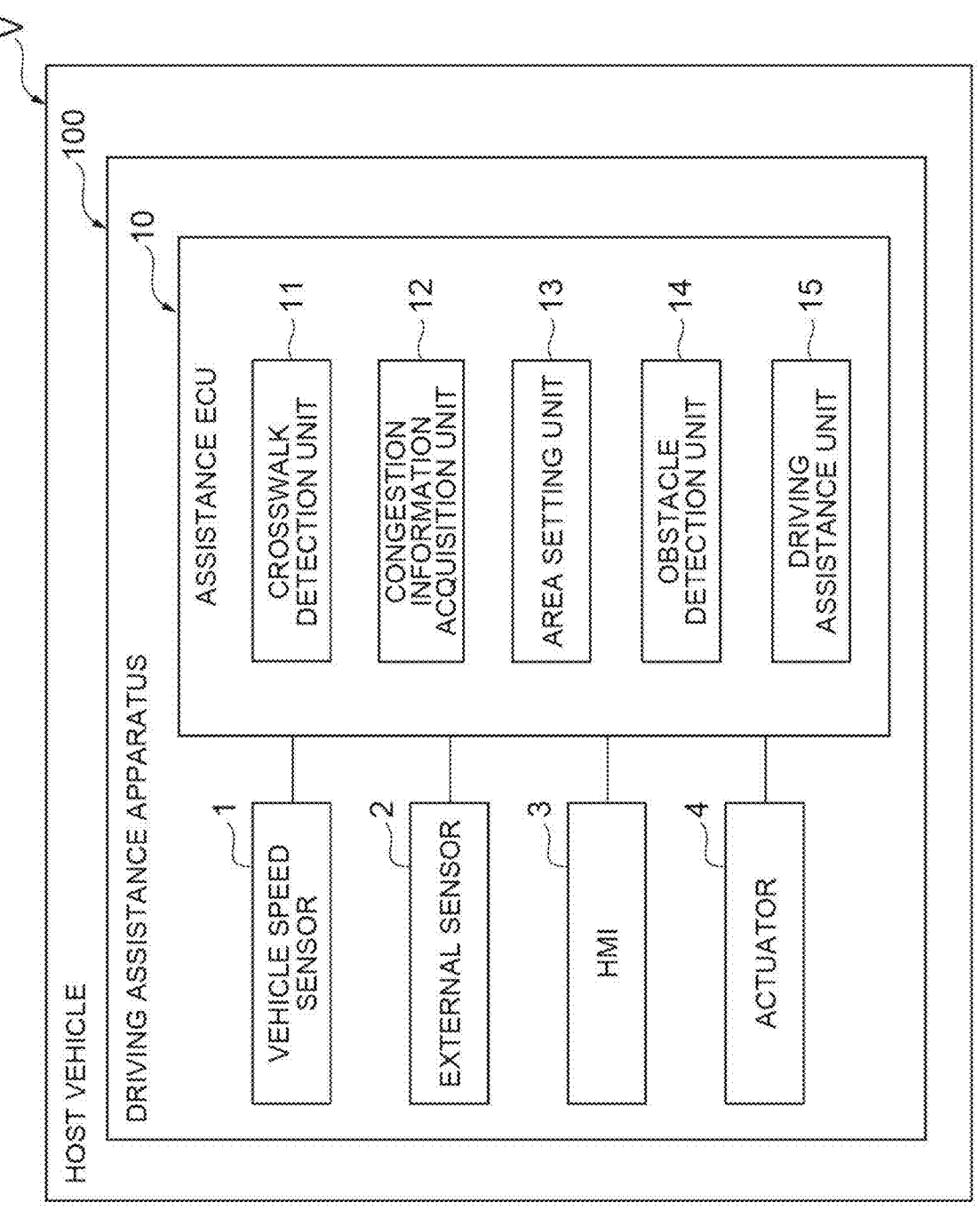
FIG. 1 is a block diagram illustrating an example of a driving assistance apparatus according to an embodiment.

Hereinafter, exemplary embodiments will be described with reference to the drawings. In the drawings, the same or corresponding elements are denoted by the same reference numerals, and redundant description will be omitted.

Figure 2:
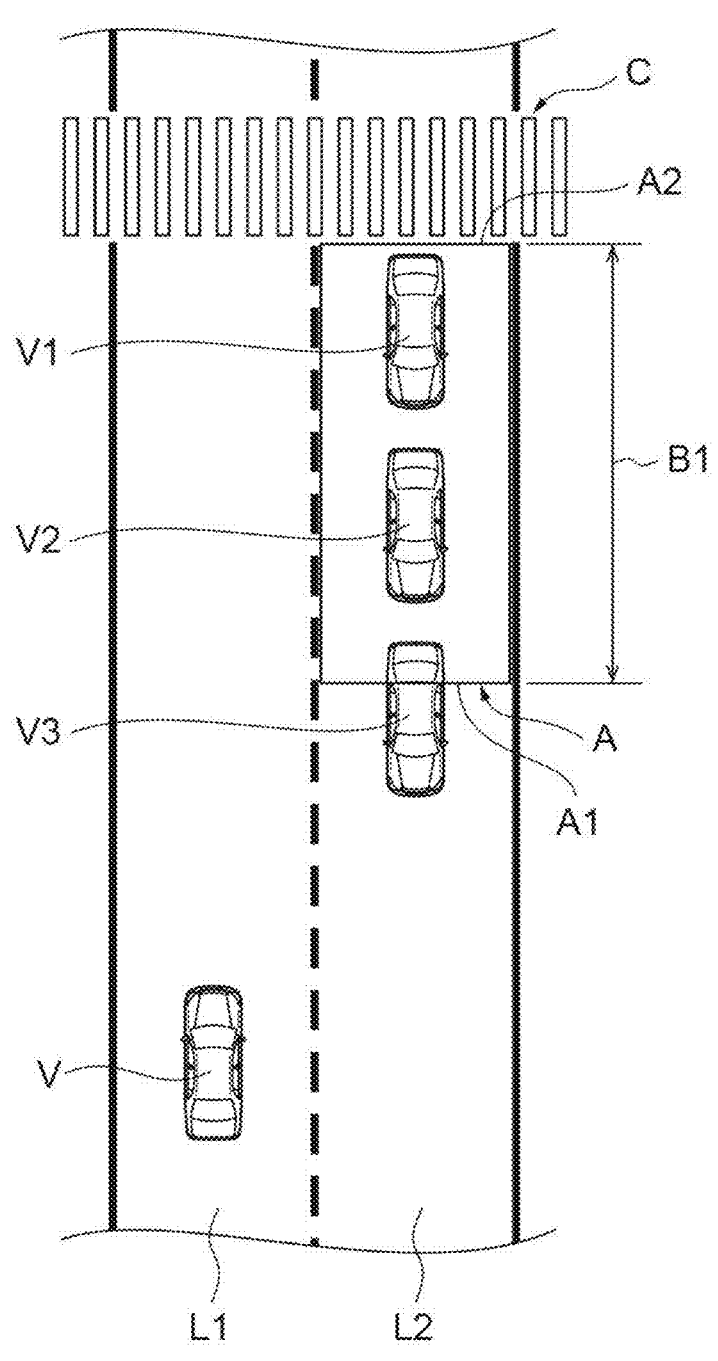
FIG. 2 is a top view illustrating an obstacle detection area set in front of a crosswalk.

A driving assistance apparatus 100 illustrated in FIG. 1 is mounted on a host vehicle V and performs driving assistance for the host vehicle V. In the present embodiment, as illustrated in FIG. 2, at a position on the near side of a crosswalk C existing in front of the host vehicle V, the driving assistance apparatus 100 performs driving assistance according to the presence or absence of an obstacle existing in front of the crosswalk C. Here, a case where the obstacle existing in front of the crosswalk C is another vehicle will be described as an example.

In the present embodiment, as illustrated in FIG. 2, it is assumed that an opposite lane L2 is adjacent to the right side of an own lane L1 on which the host vehicle V travels. That is, the opposite lane L2 is an adjacent lane adjacent to the own lane L1. The crosswalk C exists in front of the host vehicle V across the own lane L1 and the opposite lane L2. A first oncoming vehicle V1, a second oncoming vehicle V2, and a third oncoming vehicle V3 are traveling on the opposite lane L2 on the near side of the crosswalk C as viewed from the host vehicle V. The first oncoming vehicle V1 is traveling at a position closest to the crosswalk C, the third oncoming vehicle V3 is traveling at a position closest to the host vehicle V, and the second oncoming vehicle V2 is traveling at a position between the first oncoming vehicle V1 and the third oncoming vehicle V3. That is, the first oncoming vehicle V1 to the third oncoming vehicle V3 are other vehicles on the adjacent lane.

In the following description, "near" means a side close to the host vehicle V, and "far" means a side far from the host vehicle V. The "longitudinal direction" is a direction along an extending direction of the own lane L1 and/or the opposite lane L2. The "lateral direction" is a direction along the lane width direction of the own lane L1 and/or the opposite lane L2.

As illustrated in FIG. 1, the driving assistance apparatus 100 includes a vehicle speed sensor 1, an external sensor 2, a human machine interface (HMI) 3, an actuator 4, and an assistance electronic control unit (ECU) 10. The vehicle speed sensor 1 is a detector that detects the vehicle speed of the host vehicle V. The vehicle speed sensor 1 is provided, for example, on a wheel of the host vehicle V, a drive shaft that rotates integrally with the wheel, or the like, and detects the rotation speed of the wheel. The vehicle speed sensor 1 transmits vehicle speed information of the host vehicle V to the assistance ECU 10.

The external sensor 2 is an in-vehicle sensor that detects an external environment of the host vehicle V. The external sensor 2 includes at least a camera. The camera is an imaging device that captures an image of an external environment of the host vehicle V. The camera is provided, for example, on the back side of the windshield of the host vehicle V, and captures an image in front of the vehicle. The camera transmits imaging information on the external environment of the host vehicle V to the assistance ECU 10. The camera may be a monocular camera or a stereo camera. A plurality of cameras may be provided, and images of the left and right sides of the host vehicle V may be captured in addition to an image in front of the host vehicle V.

The external sensor 2 may include a radar sensor. The radar sensor is a detection device that detects an object around the host vehicle V using radio waves (for example, millimeter waves) or light. The radar sensor includes, for example, millimeter wave radar or light detection and ranging (LIDAR). The radar sensor transmits radio waves or light to the periphery of the host vehicle V, and receives radio waves or light reflected by an object. The radar sensor transmits a reception result of the radio waves or the light reflected by the object to the assistance ECU 10.

The HMI 3 is an interface for inputting and outputting information between the host vehicle V and an occupant. The HMI 3 includes, for example, a display or a speaker. The HMI 3 provides a driver with guidance regarding driving.

The actuator 4 is a device used for controlling traveling of the host vehicle V. The actuator 4 includes at least a brake actuator that controls the brake of the host vehicle V and a steering actuator that controls the steering of the host vehicle V.

The assistance ECU 10 is an electronic control unit including a central processing unit (CPU), a read only memory (ROM), and a random access memory (RAM). The assistance ECU 10 implements various functions, for example, by loading a program recorded in the ROM into the RAM and executing the program loaded into the RAM with the CPU. The assistance ECU 10 may include a plurality of electronic units. The assistance ECU 10 functionally includes a crosswalk detection unit 11, a congestion information acquisition unit 12, an area setting unit 13, an obstacle detection unit 14, and a driving assistance unit 15.

The crosswalk detection unit 11 detects the crosswalk C in front of the host vehicle V. In the present embodiment, the crosswalk detection unit 11 can detect the presence or absence of the crosswalk C using pattern matching or an image recognition technology such as semantic segmentation based on, for example, imaging information (captured image) of the camera of the external sensor 2. The crosswalk detection unit 11 detects a distance to the crosswalk C based on imaging information of the camera. The crosswalk detection unit 11 can detect the distance to the crosswalk C by using, for example, the Y coordinate (vertical coordinate) of the captured image or the size of the crosswalk area extracted through image recognition.

The crosswalk detection unit 11 may be configured to detect the crosswalk C existing within a predetermined distance from the host vehicle V. In addition to using the imaging information of the camera, the crosswalk detection unit 11 may detect the presence or absence of the crosswalk C in front of the host vehicle V and the distance to the crosswalk C based on map information.

In the present embodiment, the crosswalk detection unit 11 detects, as the crosswalk C, a crosswalk on which no traffic light is installed. The crosswalk detection unit 11 may determine the presence or absence of a traffic light by using pattern matching or an image recognition technology based on imaging information of the camera, for example. Alternatively, the crosswalk detection unit 11 may determine the presence or absence of a traffic light based on installation information of traffic lights included in the map information.

The congestion information acquisition unit 12 acquires congestion information of the opposite lane L2. Here, the congestion information indicates the density of vehicles on the travel lane. The congestion information acquisition unit 12 may acquire, for example, congestion information used in a navigation system as the congestion information of the opposite lane L2. Alternatively, the congestion information acquisition unit 12 may perform inter-vehicle communication with other vehicles traveling around. Then, the congestion information acquisition unit 12 may generate (acquire) congestion information of the opposite lane L2 based on the result of the inter-vehicle communication.

As illustrated in FIG. 2, the area setting unit 13 sets an obstacle detection area A on the near side of the crosswalk C detected by the crosswalk detection unit 11 on the opposite lane L2. The obstacle detection area A is an area where an oncoming vehicle (another vehicle, obstacle) on the opposite lane L2 is to be detected.

Here, the area setting unit 13 detects the lane width of the opposite lane L2 using a known image recognition technology based on the imaging information of the camera of the external sensor 2. The area setting unit 13 sets, as the width of the obstacle detection area A (the length in the width direction of the opposite lane L2), for example, the same length as the detected lane width of the opposite lane L2 or a length obtained by multiplying the detected lane width of the opposite lane L2 by a predetermined value. There may be a case where the lane width of the opposite lane L2 cannot be detected. In this case, the area setting unit 13 detects the lane width of the own lane L1 using a known image recognition technology based on the imaging information of the camera of the external sensor 2. The area setting unit 13 sets, as the width of the obstacle detection area A, for example, the same length as the detected lane width of the own lane L1 or a length obtained by multiplying the detected lane width of the own lane L1 by a predetermined value.

The area setting unit 13 sets a far-side boundary line A2 of the obstacle detection area A at a position of a near-side edge of the crosswalk C. The far-side boundary line A2 is a far-side edge of the obstacle detection area A. The area setting unit 13 sets a near-side boundary line A1 of the obstacle detection area A at a closer position than the far-side boundary line A2. The near-side boundary line A1 is a near-side edge of the obstacle detection area A.

The area setting unit 13 sets a length corresponding to two or more oncoming vehicles (other vehicles) to be detected as a length B1 of the obstacle detection area A along the extending direction of the opposite lane L2. That is, the area setting unit 13 sets, as the obstacle detection area A, an area having a length equal to or longer than two oncoming vehicles to be detected along the extending direction of the opposite lane L2.

The length B1 of the obstacle detection area A is a length from the near-side boundary line A1 to the far-side boundary line A2 of the obstacle detection area A provided along the extending direction of the own lane L1. Here, the oncoming vehicle to be detected is assumed to be an ordinary passenger vehicle. The ordinary passenger vehicle is a vehicle having a total length of about 5 m. As an example, the length B1 of the obstacle detection area A may be set to a length of about 30 m or less, more preferably a length of about 15 m to 20 m.

For example, it is assumed that a distance from the host vehicle V to the crosswalk C is 60 m. It is assumed that the length B1 of the obstacle detection area A set by the area setting unit 13 is 15 m. In this case, the obstacle detection area A is set on the opposite lane L2 between a position 45 m away from the host vehicle V as viewed from the host vehicle V (a position where the near-side boundary line A1 is set) and a position 60 m away from the host vehicle V (a position where the far-side boundary line A2 is set).

The area setting unit 13 can change the set length of the obstacle detection area A in the longitudinal direction based on various conditions. That is, the area setting unit 13 can change the position of the near-side boundary line A1 to be set. As a first change method, for example, the area setting unit 13 can set the length of the obstacle detection area A in the longitudinal direction according to the presence or absence of congestion on the opposite lane L2. Here, the area setting unit 13 determines whether the opposite lane L2 is congested based on the congestion information acquired by the congestion information acquisition unit 12. When there is congestion here may be, for example, when the density of oncoming vehicles on the opposite lane L2 is equal to or higher than a predetermined density. The area setting unit 13 sets the length of the obstacle detection area A in the longitudinal direction to be long when the opposite lane L2 is congested as compared to a case where the opposite lane L2 is not congested.

As a second change method, for example, the area setting unit 13 sets the length of the obstacle detection area A in the longitudinal direction to be longer as the distance to the crosswalk C detected by the crosswalk detection unit 11 is longer. As a third change method, for example, the area setting unit 13 acquires the vehicle speed of the host vehicle V based on the detection result of the vehicle speed sensor 1. Then, the area setting unit 13 sets the length of the obstacle detection area A in the longitudinal direction to be longer as the vehicle speed of the host vehicle V is faster.

The area setting unit 13 may set the length of the obstacle detection area A in the longitudinal direction based on any one of the first change method to the third change method described above, or may set the length of the obstacle detection area A in the longitudinal direction by combining two or more of these methods.

The obstacle detection unit 14 detects the presence or absence of an oncoming vehicle as an obstacle in the obstacle detection area A set by the area setting unit 13. Here, the obstacle detection unit 14 detects the presence or absence of an oncoming vehicle whose speed is equal to or less than a predetermined vehicle speed threshold in the obstacle detection area A. The vehicle speed threshold may be set to a value of, for example, 20 km/h or less to 15 km/h or less.

More specifically, first, the obstacle detection unit 14 detects the vehicle speed of another vehicle around the host vehicle V, the distance in the longitudinal direction from the host vehicle V to the other vehicle, and the lateral position of the other vehicle with reference to the host vehicle V based on the detection information of the external sensor 2. For example, the obstacle detection unit 14 can detect another vehicle using pattern matching using imaging information of the camera or an image recognition technology. Alternatively, the obstacle detection unit 14 can detect another vehicle using a known method based on the reception result of the millimeter wave radar or the LIDAR.

Then, the obstacle detection unit 14 extracts another vehicle whose speed is equal to or less than a predetermined vehicle speed threshold from among all the detected other vehicles. The obstacle detection unit 14 can determine whether the extracted other vehicle is present in the obstacle detection area A based on the detected distance in the longitudinal direction from the host vehicle V to the other vehicle and the lateral position of the other vehicle with reference to the host vehicle V.

For example, in the example illustrated in FIG. 2, it is assumed that the first oncoming vehicle V1 to the third oncoming vehicle V3 are detected, and the vehicle speeds of these vehicles are lower than or equal to the vehicle speed threshold. In this case, the obstacle detection unit 14 determines that the first oncoming vehicle V1 and the second oncoming vehicle V2 are present in the obstacle detection area A.

Figure 3:
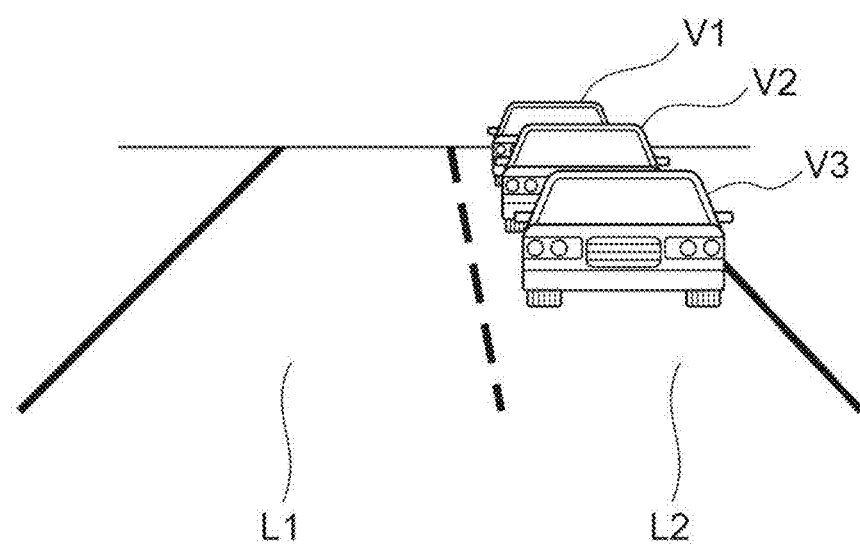
FIG. 3 is a schematic view illustrating a row of oncoming vehicles as viewed from a host vehicle.

Here, there is a case where a plurality of other vehicles are traveling in a row in an adjacent lane adjacent to the own lane in which the host vehicle V travels. In this case, when other vehicles on the adjacent lane are viewed from the host vehicle V, another vehicle on the far side as viewed from the host vehicle has a larger area hidden by another vehicle immediately before the other vehicle. For example, in the situation illustrated in FIG. 2, as illustrated in FIG. 3, when viewed from the host vehicle V, the first oncoming vehicle V1 is only partially visible because the first oncoming vehicle V1 is hidden by the second oncoming vehicle V2. The second oncoming vehicle V2 is also partially hidden by the third oncoming vehicle V3.

When a vehicle is detected based on a detection result of the external sensor 2, an object is usually detected as a vehicle based on the shape of the detected object. That is, when the obstacle detection unit 14 detects a plurality of consecutive oncoming vehicles based on the detection result of the external sensor 2, a farther oncoming vehicle is more difficult to detect. Thus, when an oncoming vehicle present in front of the crosswalk C on the opposite lane L2 is detected, a nearer oncoming vehicle can also be included in the detection target vehicle as the length of the obstacle detection area A in the longitudinal direction is increased. As described above, the oncoming vehicle on the nearer side is more easily viewable from the host vehicle V. This makes it possible to increase the possibility that the obstacle detection unit 14 can detect an oncoming vehicle present in front of the crosswalk C on the opposite lane L2 as an oncoming vehicle.

When the obstacle detection unit 14 detects one or more oncoming vehicles whose speed is equal to or less than the vehicle speed threshold in the obstacle detection area A, the driving assistance unit 15 performs driving assistance for the host vehicle V. This driving assistance is assistance for preparing for a case where a pedestrian or the like who is about to cross the crosswalk C is present in an area that is a blind spot because of an oncoming vehicle on the opposite lane L2.

The driving assistance unit 15 performs at least one of notification to the occupant of the host vehicle V, steering control of the host vehicle V, and deceleration control of the host vehicle V as driving assistance. The driving assistance unit 15 can notify the occupant of the host vehicle V using the HMI3. This notification may be a notification for calling attention to a possibility that a pedestrian or the like who is about to cross the crosswalk C is present. The driving assistance unit 15 can perform steering control and deceleration control of the host vehicle V using the actuator 4. This steering control may be, for example, steering the host vehicle V so that the host vehicle V moves away from the opposite lane L2 in preparation for a pedestrian or the like jumping out from behind the oncoming vehicle.

The driving assistance unit 15 can perform driving assistance when a predetermined assist timing condition is satisfied. For example, the assist timing condition may be determined using an arrival time until the host vehicle V reaches the crosswalk C. For example, the assist timing condition may be that "the arrival time to the crosswalk C is within a predetermined range". In this case, for example, the driving assistance unit 15 calculates the arrival time to the crosswalk C based on the distance to the crosswalk C detected by the crosswalk detection unit 11 and the vehicle speed of the host vehicle V obtained based on the detection result of the vehicle speed sensor 1. The driving assistance unit 15 performs driving assistance when the calculated arrival time satisfies the assist timing condition. The predetermined assist timing condition may be, for example, when the arrival time to the crosswalk C is 5 seconds or less. In addition to the arrival time to the crosswalk C, various assist timing conditions may be determined in advance based on the distance to the crosswalk C.

Next, a flow of driving assistance processing performed by the driving assistance apparatus 100 in front of a crosswalk will be described. The driving assistance performed by the driving assistance apparatus 100 here is driving assistance for preparing for a case where a pedestrian or the like who is about to cross a crosswalk is present behind an oncoming vehicle. Here, the driving assistance performed by the driving assistance apparatus 100 will be described, but another driving assistance apparatus may execute driving assistance different from the driving assistance performed by the driving assistance apparatus 100.

Figure 4:
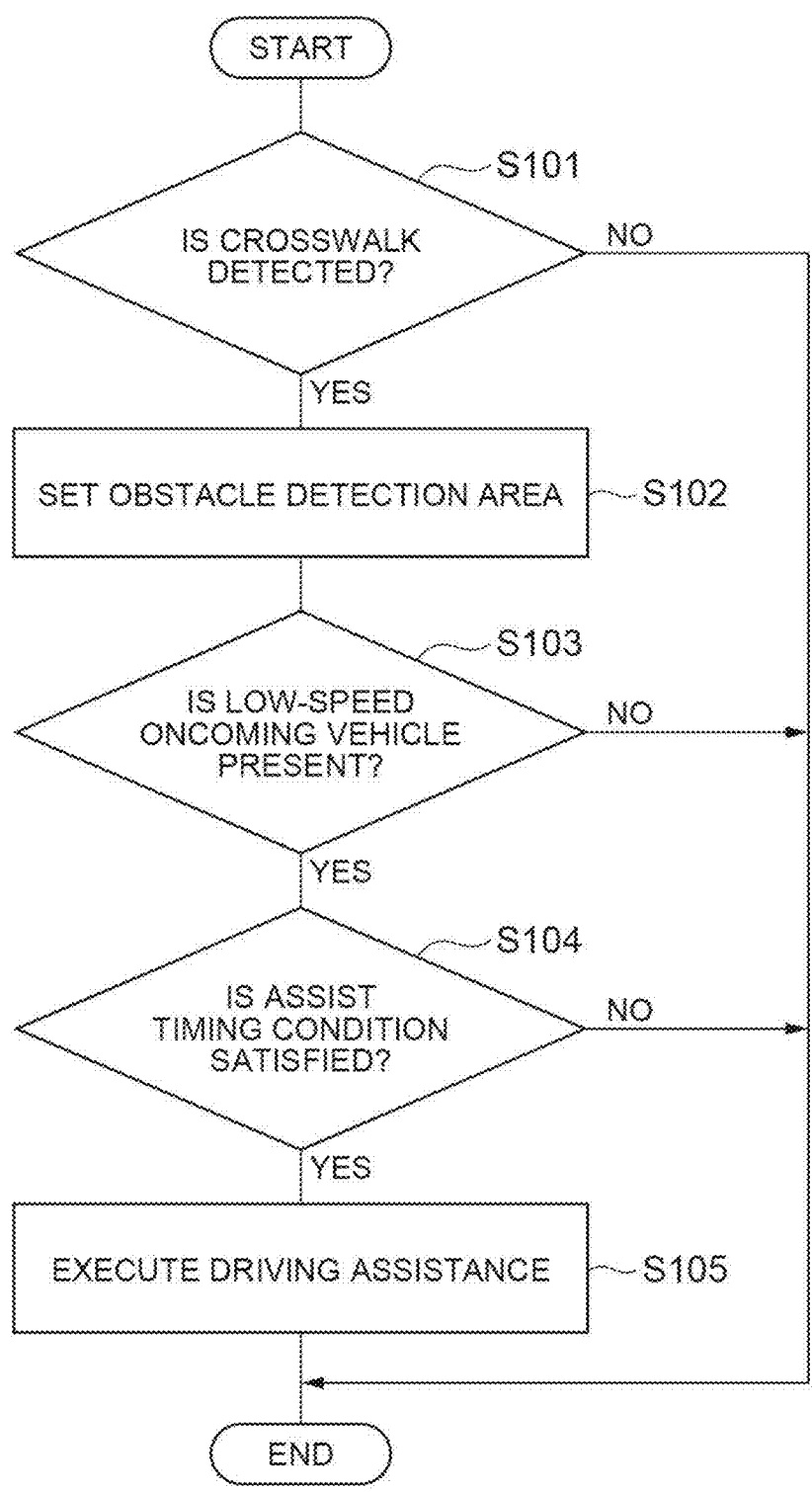
FIG. 4 is a flowchart illustrating a flow of driving assistance processing performed in the driving assistance apparatus.

As illustrated in FIG. 4, the crosswalk detection unit 11 of the driving assistance apparatus 100 detects whether there is a crosswalk where no traffic light is installed in front of the host vehicle V (S101). Here, when there is a crosswalk where no traffic light is installed, the crosswalk detection unit 11 also detects the distance to the crosswalk. When the crosswalk where no traffic light is installed is not detected (S101: NO), the driving assistance apparatus 100 starts processing from the start again after a predetermined time.

When the crosswalk C where no traffic light is installed is detected (S101: YES), the area setting unit 13 sets the obstacle detection area A on the near side of the crosswalk C on the opposite lane L2 (S102). The obstacle detection unit 14 detects the presence or absence of an oncoming vehicle whose speed is equal to or less than the vehicle speed threshold (low-speed oncoming vehicle) in the obstacle detection area A (S103). When there is no oncoming vehicle whose speed is equal to or less than the vehicle speed threshold (S103: NO), the driving assistance apparatus 100 starts processing from the start again after a predetermined time.

When there is an oncoming vehicle whose speed is equal to or less than the vehicle speed threshold (S103: YES), the driving assistance unit 15 determines whether the assist timing condition for providing driving assistance is satisfied based on the distance to the crosswalk C (S104). When the assist timing condition is not satisfied (S104: NO), the driving assistance apparatus 100 starts processing from the start again after a predetermined time. When the assist timing condition is satisfied (S104: YES), the driving assistance unit 15 performs driving assistance for the host vehicle V (S105).

In this manner, the driving assistance apparatus 100 performs driving assistance when an oncoming vehicle is detected in the obstacle detection area A set in front of the crosswalk C on the opposite lane L2. That is, the driving assistance apparatus 100 performs driving assistance in advance in preparation for a case where a pedestrian or the like who is about to cross the crosswalk C is present in a situation where a blind spot is generated by an oncoming vehicle in the obstacle detection area A. The driving assistance apparatus 100 thus can more appropriately performs driving assistance for the host vehicle V in front of the crosswalk C.

For example, a plurality of oncoming vehicles may form a row in front of a crosswalk on the opposite lane L2. In this case, as described with reference to FIG. 3, an oncoming vehicle closer to the far side (the side closer to the crosswalk) as viewed from the host vehicle V has a larger area hidden by an oncoming vehicle immediately in front of the oncoming vehicle. For this reason, it is more difficult to detect the oncoming vehicle on the farther side as an oncoming vehicle. In other words, when an oncoming vehicle on the opposite lane L2 is detected, the oncoming vehicle is more easily detected as the oncoming vehicle is closer to the host vehicle V. Thus, the driving assistance apparatus 100 sets an area having a length equal to or longer than two oncoming vehicles as the obstacle detection area A for detecting the oncoming vehicle.

This allows the driving assistance apparatus 100 to easily detect an oncoming vehicle located on the near side even when it is difficult to detect an oncoming vehicle on the far side because of a row of oncoming vehicles on the opposite lane L2, for example. For example, in the example illustrated in FIG. 2, even when the first oncoming vehicle V1 cannot be detected as an oncoming vehicle existing in front of the crosswalk C, the second oncoming vehicle V2 can be more likely to be detected. In this manner, the driving assistance apparatus 100 can more appropriately detect an oncoming vehicle located on the near side of the crosswalk C on the opposite lane L2. Then, the driving assistance apparatus 100 can perform driving assistance based on the detected oncoming vehicle.

When congestion occurs in the opposite lane L2, oncoming vehicles form a row in the opposite lane L2. In this case, an oncoming vehicle on the far side as viewed from the host vehicle V has a larger area hidden by an oncoming vehicle immediately before the oncoming vehicle and is difficult to be detected. Thus, when congestion occurs in the opposite lane L2, the driving assistance apparatus 100 sets the length of the obstacle detection area A in the longitudinal direction to be long. This allows the driving assistance apparatus 100 to more appropriately detect an oncoming vehicle located on the near side of the crosswalk C on the opposite lane L2 even when other vehicles form a row.

For example, it may be difficult to detect an oncoming vehicle at a position distant from the host vehicle because of the influence of noise or the like. Thus, the area setting unit 13 sets the length of the obstacle detection area A in the longitudinal direction to be longer as the distance to the crosswalk C is longer. This allows the driving assistance apparatus 100 to increase the possibility of detecting an oncoming vehicle located on the near side of the crosswalk C on the opposite lane L2. However, when the length of the obstacle detection area A in the longitudinal direction increases, there is a high possibility that an oncoming vehicle is erroneously detected. For this reason, for example, from various viewpoints, such as suppressing such erroneous detection, a configuration may be adopted in which the length of the obstacle detection area A in the longitudinal direction is set shorter as the distance to the crosswalk C is longer.

When the vehicle speed of the host vehicle V is fast, the moving amount of an oncoming vehicle becomes relatively large, and it may be difficult to detect the oncoming vehicle. Thus, the area setting unit 13 sets the length of the obstacle detection area A in the longitudinal direction to be longer as the vehicle speed of the host vehicle V is faster. This allows the driving assistance apparatus 100 to increase the possibility of detecting an oncoming vehicle located on the near side of the crosswalk C on the opposite lane L2. However, when the length of the obstacle detection area A in the longitudinal direction increases, there is a high possibility that an oncoming vehicle is erroneously detected. For this reason, for example, from various viewpoints, such as suppressing such erroneous detection, a configuration may be adopted in which the length of the obstacle detection area A in the longitudinal direction is set shorter as the vehicle speed of the host vehicle V is faster.

For example, there is a case where the vehicle speed of an oncoming vehicle on the opposite lane L2 is fast. Such a case where the vehicle speed of the oncoming vehicle is fast is considered to be a situation where there is no pedestrian or the like who is about to cross the crosswalk C. Thus, the driving assistance unit 15 performs driving assistance when an oncoming vehicle whose speed is equal to or less than the vehicle speed threshold is detected in the obstacle detection area A. This allows the driving assistance apparatus 100 to perform driving assistance in consideration of the possibility of the presence of a pedestrian or the like who is about to cross the crosswalk C.

Although an embodiment of the present disclosure have been described above, the present disclosure is not limited to the above embodiment. For example, in the above embodiment, an oncoming vehicle present on the near side of the crosswalk C on the opposite lane L2 is detected. The driving assistance apparatus 100 is not limited to detecting an oncoming vehicle on the opposite lane L2 opposing the own lane L1. Hereinafter, a first modification and a second modification of the driving assistance apparatus 100 that detects another vehicle other than the oncoming vehicles on the opposite lane L2 will be described.

First Modification

Figure 5:
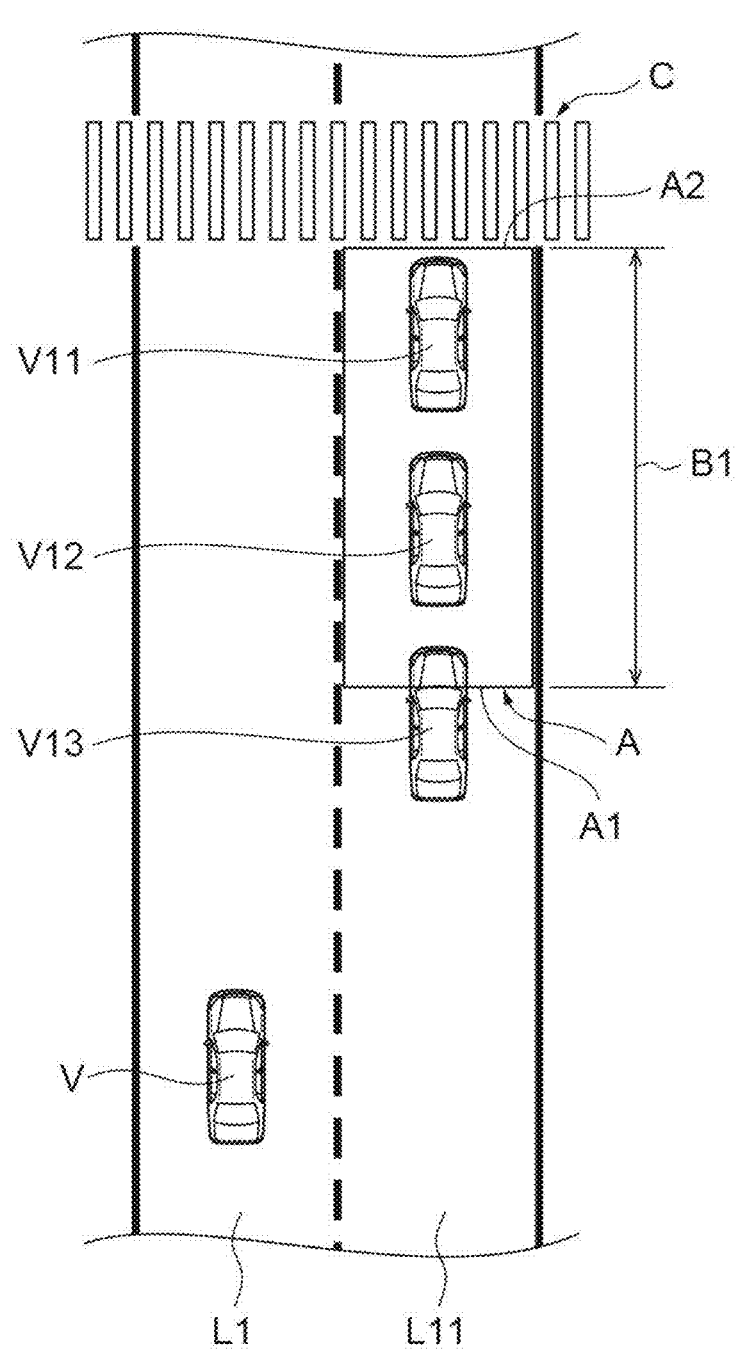
FIG. 5 is a top view illustrating an obstacle detection area set in front of a crosswalk in a first modification.

In the first modification, for example, as illustrated in FIG. 5, it is assumed that an adjacent lane L11 is adjacent to the right side of the own lane L1 on which the host vehicle V travels. The adjacent lane L11 is a lane on which vehicles travel in the same direction as the vehicles on the own lane L1. That is, the host vehicle V is traveling on the left lane (the own lane L1) of the road having two lanes on each side. A first other vehicle V11, a second other vehicle V12, and a third other vehicle V13 are traveling on the adjacent lane L11 on the near side of the crosswalk C as viewed from the host vehicle V. The first other vehicle V11 is traveling at a position closest to the crosswalk C, the third other vehicle V13 is traveling at a position closest to the host vehicle V, and the second other vehicle V12 is traveling at a position between the first other vehicle V11 and the third other vehicle V13. That is, the first other vehicle V11 to the third other vehicle V13 are other vehicles on the adjacent lane.

In this case, the driving assistance apparatus 100 performs driving assistance based on the adjacent lane L11 and the other vehicles (the first other vehicle V11 to the third other vehicle V13) instead of the opposite lane L2 and the oncoming vehicles (the first oncoming vehicle V1 to the third oncoming vehicle V3) in the above-described embodiment. Specifically, the congestion information acquisition unit 12 acquires congestion information of the adjacent lane L11 instead of the opposite lane L2 described in the embodiment. The area setting unit 13 sets the obstacle detection area A on the near side of the crosswalk C on the adjacent lane L11 instead of the opposite lane L2 described in the embodiment. The obstacle detection unit 14 detects another vehicle in the obstacle detection area A instead of the oncoming vehicle described in the embodiment. The driving assistance unit 15 performs driving assistance for the host vehicle V in accordance with the presence or absence of another vehicle in the obstacle detection area A on the adjacent lane L11.

In this case as well, like the above-described embodiment, the driving assistance apparatus 100 can detect another vehicle on the adjacent lane L11 on the near side of the crosswalk C, and can more appropriately perform driving assistance for the host vehicle V.

Second Modification

Figure 6:
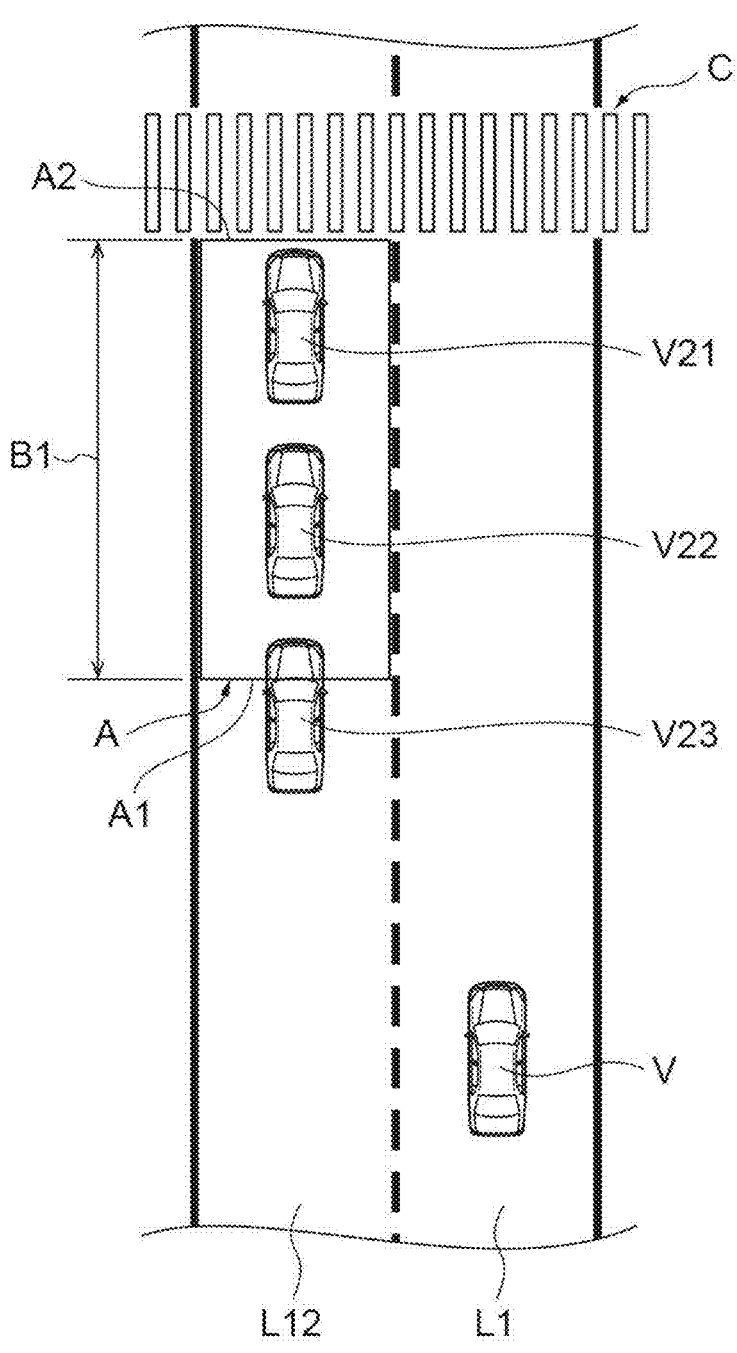
FIG. 6 is a top view illustrating an obstacle detection area set in front of a crosswalk in a second modification.

In the second modification, for example, as illustrated in FIG. 6, it is assumed that an adjacent lane L12 is adjacent to the left side of the own lane L1 on which the host vehicle V travels. The adjacent lane L12 is a lane on which vehicles travel in the same direction as the vehicles on the own lane L1. That is, the host vehicle V is traveling on the right lane (the own lane L1) of the road having two lanes on each side. A first other vehicle V21, a second other vehicle V22, and a third other vehicle V23 are traveling on the adjacent lane L12 on the near side of the crosswalk C as viewed from the host vehicle V. The first other vehicle V21 is traveling at a position closest to the crosswalk C, the third other vehicle V23 is traveling at a position closest to the host vehicle V, and the second other vehicle V22 is traveling at a position between the first other vehicle V21 and the third other vehicle V23. That is, the first other vehicle V21 to the third other vehicle V23 are other vehicles on the adjacent lane.

In this case, the driving assistance apparatus 100 performs driving assistance based on the adjacent lane L12 and the other vehicles (the first other vehicle V21 to the third other vehicle V23) instead of the opposite lane L2 and the oncoming vehicles (the first oncoming vehicle V1 to the third oncoming vehicle V3) in the above-described embodiment. Specifically, the congestion information acquisition unit 12 acquires congestion information of the adjacent lane L12 instead of the opposite lane L2 described in the embodiment. The area setting unit 13 sets the obstacle detection area A on the near side of the crosswalk C on the adjacent lane L12 instead of the opposite lane L2 described in the embodiment. The obstacle detection unit 14 detects another vehicle in the obstacle detection area A instead of the oncoming vehicle described in the embodiment. The driving assistance unit 15 performs driving assistance for the host vehicle V in accordance with the presence or absence of another vehicle in the obstacle detection area A on the adjacent lane L12.

In this case as well, like the above-described embodiment, the driving assistance apparatus 100 can detect another vehicle on the adjacent lane L12 on the near side of the crosswalk C, and can more appropriately perform driving assistance for the host vehicle V.

Here, in the above-described embodiment and each modification, another vehicle traveling on an adjacent lane adjacent to the own lane L1 is detected. The driving assistance apparatus 100 is not limited to this configuration, and the driving assistance apparatus 100 may detect another vehicle parked (stopped) straddling an adjacent lane and the road shoulder as another vehicle in the adjacent lane. Hereinafter, a third modification and a fourth modification of the driving assistance apparatus 100 capable of detecting another vehicle parked straddling an adjacent lane and the road shoulder will be described.

Third Modification

Figure 7:
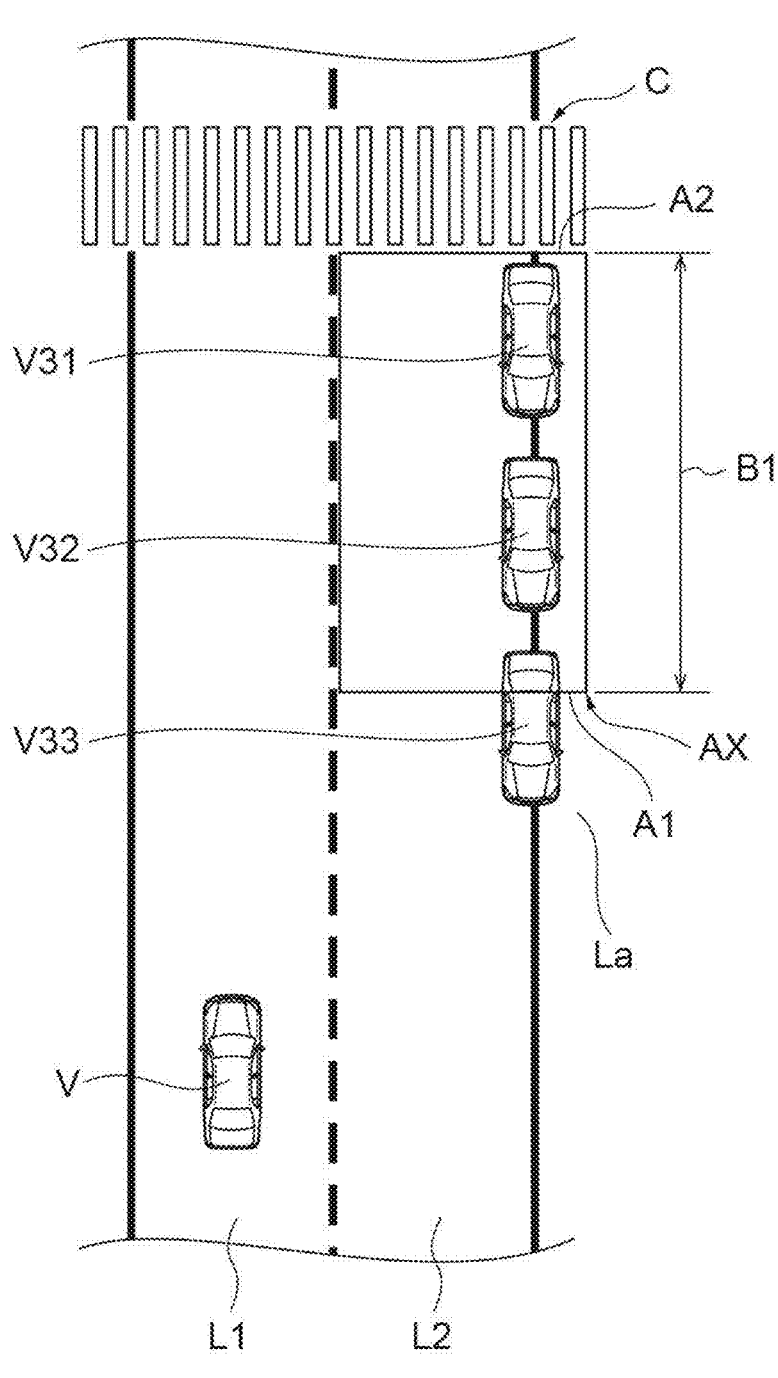
FIG. 7 is a top view illustrating an obstacle detection area set in front of a crosswalk in a third modification.

In the third modification, as illustrated in FIG. 7, it is assumed that an opposite lane L2 is adjacent to the right side of the own lane L1 on which the host vehicle V travels. That is, the opposite lane L2 is an adjacent lane adjacent to the own lane L1. A first other vehicle V31, a second other vehicle V32, and a third other vehicle V33 are parked on the near side of the crosswalk C as viewed from the host vehicle V straddling the opposite lane L2 and a road shoulder La on the right side of the opposite lane L2. The first other vehicle V31 is parked at a position closest to the crosswalk C, the third other vehicle V33 is parked at a position closest to the host vehicle V, and the second other vehicle V32 is parked at a position between the first other vehicle V31 and the third other vehicle V33. That is, the parked first other vehicle V31 to third other vehicle V33 are other vehicles on the adjacent lane.

In this case, the driving assistance apparatus 100 performs driving assistance based on the other vehicles (the first other vehicle V31 to the third other vehicle V33) parked straddling the opposite lane L2 and the road shoulder La, instead of the oncoming vehicles (the first oncoming vehicle V1 to the third oncoming vehicle V3) in the above-described embodiment.

Specifically, like the obstacle detection area A described in the above-described embodiment, the area setting unit 13 sets an obstacle detection area AX on the near side of the crosswalk C on the opposite lane L2. At this time, the area setting unit 13 sets the obstacle detection area AX enlarged rightward from the opposite lane L2 such that the right boundary line includes the shoulder La in order to detect other vehicles parked straddling the opposite lane L2 and the shoulder La. The obstacle detection unit 14 detects another vehicle in the obstacle detection area AX instead of the oncoming vehicle described in the embodiment. The driving assistance unit 15 performs driving assistance for the host vehicle V according to the presence or absence of other vehicles (parked vehicles) in the obstacle detection area AX set straddling the opposite lane L2 and the road shoulder La.

In this manner, the driving assistance apparatus 100 also detects, as other vehicles on the opposite lane L2, other vehicles parked straddling the opposite lane L2 and the road shoulder La and partially entering the opposite lane L2. In this case as well, in the same manner as in the above-described embodiment, the driving assistance apparatus 100 can detect another vehicle parked straddling the opposite lane L2 and the road shoulder La on the near side of the crosswalk C, and can more appropriately perform driving assistance for the host vehicle V.

Fourth Modification

Figure 8:
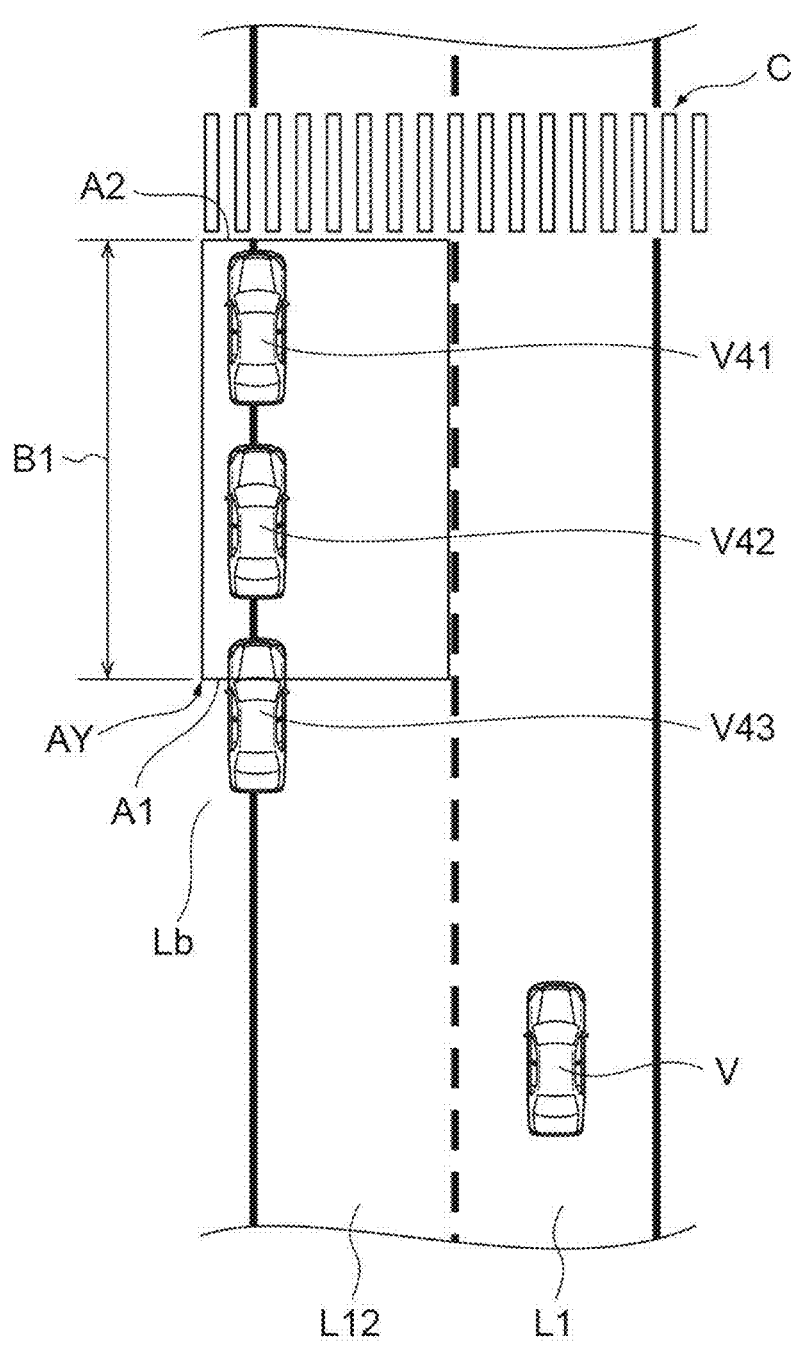
FIG. 8 is a top view illustrating an obstacle detection area set in front of a crosswalk in a fourth modification.

In the fourth modification, for example, as illustrated in FIG. 8, it is assumed that an adjacent lane L12 is adjacent to the left side of the own lane L1 on which the host vehicle V travels. A first other vehicle V41, a second other vehicle V42, and a third other vehicle V43 are parked on the near side of the crosswalk C as viewed from the host vehicle V straddling the adjacent lane L12 and a road shoulder Lb on the left side of the adjacent lane L12. The first other vehicle V41 is parked at a position closest to the crosswalk C, the third other vehicle V43 is parked at a position closest to the host vehicle V, and the second other vehicle V42 is parked at a position between the first other vehicle V41 and the third other vehicle V43. That is, the parked first other vehicle V41 to third other vehicle V43 are other vehicles on the adjacent lane.

In this case, the driving assistance apparatus 100 performs driving assistance based on the other vehicles (the first other vehicle V41 to the third other vehicle V43) parked straddling the adjacent lane L12 and the road shoulder Lb, instead of the oncoming vehicles (the first oncoming vehicle V1 to the third oncoming vehicle V3) in the above-described embodiment.

Specifically, like the obstacle detection area A described in the embodiment, the area setting unit 13 sets an obstacle detection area AY on the near side of the crosswalk C on the adjacent lane L12. At this time, the area setting unit 13 sets the obstacle detection area AY enlarged leftward from the adjacent lane L12 such that the right boundary line includes the shoulder Lb in order to detect other vehicles parked straddling the adjacent lane L12 and the shoulder Lb. The obstacle detection unit 14 detects another vehicle in the obstacle detection area AY instead of the oncoming vehicle described in the above embodiment. The driving assistance unit 15 performs driving assistance for the host vehicle V according to the presence or absence of other vehicles (parked vehicles) in the obstacle detection area AY set straddling the adjacent lane L12 and the road shoulder Lb.

In this manner, the driving assistance apparatus 100 also detects, as other vehicles on the adjacent lane L12, other vehicles parked straddling the adjacent lane L12 and the road shoulder Lb and partially entering the adjacent lane L12. In this case as well, in the same manner as in the above-described embodiment, the driving assistance apparatus 100 can detect another vehicle parked straddling the adjacent lane L12 and the road shoulder Lb on the near side of the crosswalk C, and can more appropriately perform driving assistance for the host vehicle V.

Figure 9:
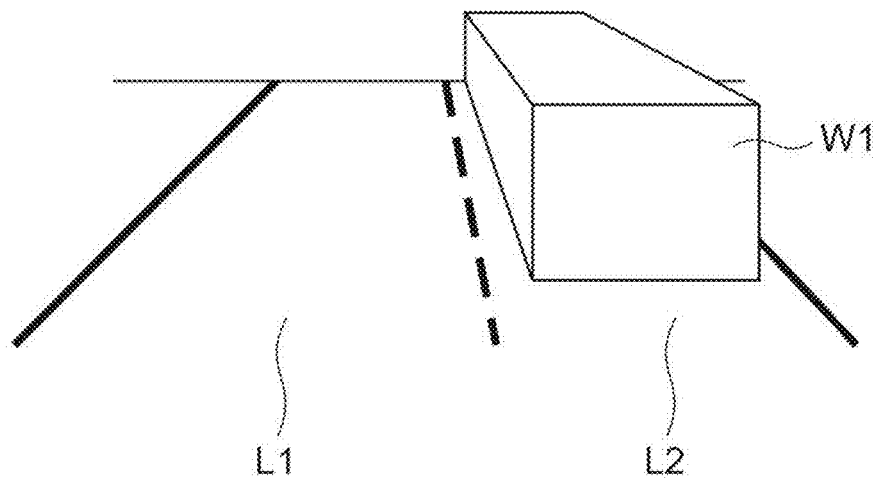
FIG. 9 is a diagram illustrating an example of an obstacle existing in front of a crosswalk.
Figure 10:
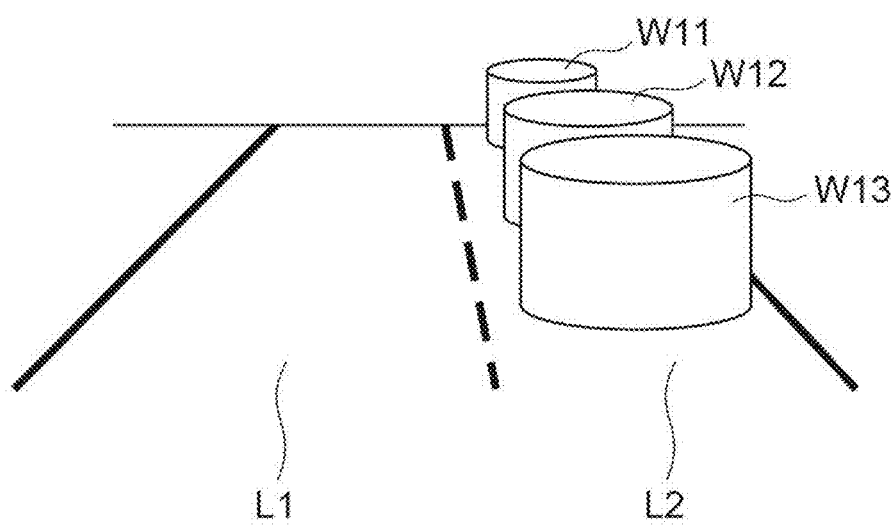
FIG. 10 is a diagram illustrating another example of an obstacle existing in front of a crosswalk.
Figure 11:
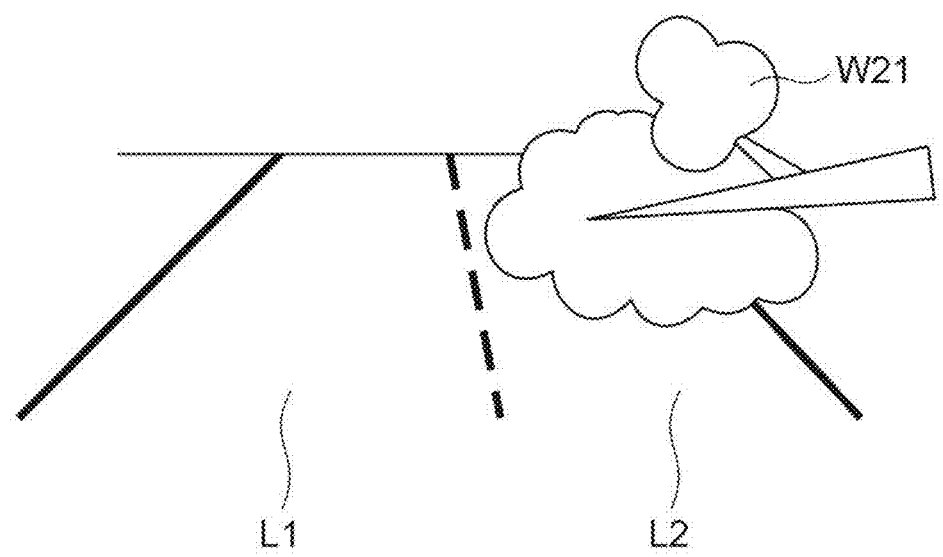
FIG. 11 is a diagram illustrating still another example of an obstacle existing in front of a crosswalk.

In the embodiment and the modifications described above, the obstacle detection unit 14 detects a vehicle as an obstacle in the obstacle detection area A. The obstacle detection unit 14 is not limited to detecting a vehicle as an obstacle. For example, as illustrated in FIG. 9, there may be a large obstacle W1 on the near side of the crosswalk on the opposite lane L2. As illustrated in FIG. 10, obstacles W11 to W13 may be continuously present on the near side of the crosswalk on the opposite lane L2. Examples of these obstacles W1, W11 to W13 include objects other than vehicles such as heavy machines and signboards placed for road construction. In addition, for example, as illustrated in FIG. 11, there may be a fallen tree W21 that is a tree grown on the side of the road and fallen on the near side of the crosswalk on the opposite lane L2. The obstacle detection unit 14 may detect, for example, the obstacles W1, W11 to W13 such as heavy machines, the fallen tree W21, and the like as obstacles. This allows the driving assistance apparatus 100 to perform driving assistance for the host vehicle V based on the presence or absence of an obstacle other than a vehicle as in the above-described embodiment and the modifications.

At least part of the embodiment and various modifications described above may be freely combined.

What is claimed is:

1. A driving assistance apparatus configured to perform a driving assistance for a host vehicle, the driving assistance apparatus comprising:

a crosswalk detection unit configured to detect a crosswalk in front of the host vehicle;

an area setting unit configured to set, on an adjacent lane that is adjacent to an own lane, an obstacle detection area for detecting an obstacle on the adjacent lane on a near side of the crosswalk that has been detected;

an obstacle detection unit configured to detect a presence or absence of the obstacle in the obstacle detection area that has been set;

a driving assistance unit configured to perform the driving assistance including at least one of steering control of the host vehicle, or deceleration control of the host vehicle when the obstacle is detected in the obstacle detection area; and a congestion information acquisition unit configured to acquire congestion information of the adjacent lane, wherein the area setting unit is configured to determine whether the adjacent lane is congested based on the congestion information that has been acquired, and the area setting unit is configured to set a length of the obstacle detection area along an extending direction of the adjacent lane to be longer when the adjacent lane is congested as compared to a case where the adjacent lane is not congested, wherein the area setting unit is configured to set the length of the obstacle detection area along the extending direction of the adjacent lane to be longer as a vehicle speed of the host vehicle is faster.

2. The driving assistance apparatus according to claim 1, wherein the area setting unit is configured to set an area having a length equal to or longer than two other vehicles along an extending direction of the adjacent lane as the obstacle detection area.

3. The driving assistance apparatus according to claim 1, wherein the area setting unit is configured to set the length of the obstacle detection area along the extending direction of the adjacent lane to be longer as a distance to the crosswalk is longer.

4. The driving assistance apparatus according to claim 1, wherein the obstacle detection unit is configured to detect, as a presence or absence of the obstacle, a presence or absence of another vehicle whose speed is equal to or less than a predetermined vehicle speed threshold in the obstacle detection area, and the driving assistance unit is configured to perform the driving assistance when the other vehicle whose speed is equal to or less than the vehicle speed threshold is detected in the obstacle detection area.

5. The driving assistance apparatus according to claim 1, wherein the driving assistance unit is further configured to perform notification to an occupant of the host vehicle.

6. The driving assistance apparatus according to claim 1, wherein the crosswalk detection unit is configured to detect, as the crosswalk, a crosswalk on which no traffic light is installed.

7. The driving assistance apparatus according to claim 1, wherein the area setting unit is configured to set a far-side boundary line of the obstacle detection area at a position of a near-side edge of the crosswalk, the far-side boundary line being on a side farther from the host vehicle.

8. The driving assistance apparatus according to claim 1, wherein the driving assistance unit is configured to perform the driving assistance when a predetermined assist timing condition based on an arrival time for the host vehicle to reach the crosswalk is satisfied.

9. The driving assistance apparatus according to claim 1, wherein the area setting unit is configured to set a width of the obstacle detection area based on a lane width of the adjacent lane.

10. The driving assistance apparatus according to claim 1, wherein the driving assistance unit is configured to perform steering control to steer the host vehicle away from the adjacent lane when the obstacle is detected in the obstacle detection area.

11. A driving assistance apparatus configured to perform a driving assistance for a host vehicle, the driving assistance apparatus comprising:

a crosswalk detection unit configured to detect a crosswalk in front of the host vehicle;

an area setting unit configured to set, on an adjacent lane that is adjacent to an own lane, an obstacle detection area for detecting an obstacle on the adjacent lane on a near side of the crosswalk that has been detected;

an obstacle detection unit configured to detect a presence or absence of the obstacle in the obstacle detection area that has been set; and a driving assistance unit configured to perform the driving assistance including at least one of steering control of the host vehicle, or deceleration control of the host vehicle when the obstacle is detected in the obstacle detection area, wherein the area setting unit is configured to set an area having a length equal to or longer than two other vehicles along an extending direction of the adjacent lane as the obstacle detection area, wherein the area setting unit is configured to set the length of the obstacle detection area along the extending direction of the adjacent lane to be longer as a vehicle speed of the host vehicle is faster.

12. The driving assistance apparatus according to claim 11, wherein the driving assistance unit is further configured to perform notification to an occupant of the host vehicle.

13. The driving assistance apparatus according to claim 11, wherein the crosswalk detection unit is configured to detect, as the crosswalk, a crosswalk on which no traffic light is installed.

14. The driving assistance apparatus according to claim 11, wherein the area setting unit is configured to set a far-side boundary line of the obstacle detection area at a position of a near-side edge of the crosswalk, the far-side boundary line being on a side farther from the host vehicle.

15. The driving assistance apparatus according to claim 11, wherein the driving assistance unit is configured to perform the driving assistance when a predetermined assist timing condition based on an arrival time for the host vehicle to reach the crosswalk is satisfied.

16. The driving assistance apparatus according to claim 11, wherein the area setting unit is configured to set a width of the obstacle detection area based on a lane width of the adjacent lane.

17. The driving assistance apparatus according to claim 11, wherein the driving assistance unit is configured to perform steering control to steer the host vehicle away from the adjacent lane when the obstacle is detected in the obstacle detection area.

* * * * *